United States Patent Office 3,231,709
Patented Jan. 25, 1966

3,231,709
WELDING METHOD AND ELECTRODE
William R. Foley, Jr., Allison Park, Pa., assignor to The McKay Company, Pittsburgh, Pa., a corporation of Pennsylvania
No Drawing. Continuation of abandoned application Ser. No. 211,428, July 20, 1962. This application June 17, 1963, Ser. No. 288,075
6 Claims. (Cl. 219—76)

This invention relates to a welding method and electrode. It relates more particularly to a welding method and electrode for forming a titanium carbide-containing hard facing weld deposit. This application is a continuation of my copending application Serial No. 211,428, filed July 20, 1962, now abandoned.

The use of previously formed hard metal carbides, particularly tungsten carbide, in hard facing weld deposits has been practiced for many years. There are several methods by which such metal carbides may be bonded to surfaces exposed to severe abrasion. In one type of hard-facing operation a metallic tubular electrode packed with discrete carbide particles is heated so that the molten metal carrying the carbide particles can be deposited on the surface of the tool or part to be hard-faced. This discrete, granulated particles of the previously formed hard metal carbide are thus trapped and imbedded in the metal supplied by the container tube where they are bonded to the tool surface upon solidification and result in an overlay of carbides cemented in place. This method of utilizing the excellent wear resistant properties of hard metal carbides, usually tungsten carbide, has proven to be very successful and is still widely used in special applications even though the electrodes are expensive.

There are several disadvantages to this method of utilizing hard carbides for wear resistant applications.

(1) The overlays of carbides cemented in place are of necessity relatively high in concentration of metal carbide and the overlays, therefore, have mechanical properties similar to those of the metal carbide, i.e., extreme brittleness, low shock resistance, poor oxidation resistance and low corrosion resistance in many media.

(2) With too high a temperature tungsten carbide particles tend to settle to the bottom of the deposit due to their greater density, thereby leaving a soft top layer of bond metal. Gas welding is often preferred to electric arc welding because the operation is slower and the temperature can be more carefully controlled.

(3) A person highly skilled in the art of this type of deposition is required to obtain a satisfactory deposit as the temperature, time and welding atmosphere (in the case of oxyactylene welding) are critical and must be carefully controlled by the welder.

(4) The process is time consuming and is not economically feasible where large surfaces are involved.

(5) The electrodes are very expensive due to the high cost of preformed carbides.

A second method of achieving high concentrations of hard metal carbides in a deposit is one in which an applicator stick composed, for example, of metal oxide particles and carbon bonded together is reacted and transferred to the piece to be hard surfaced. The metal oxides are converted to carbides by carbon present in the applicator stick if a sufficiently high temperature is maintained for the conversion to take place. This method of surfacing involves an external heat source which produces superficial melting of the surface of the piece to be hard-faced while simultaneously heating the applicator stick and preparing the carbide particles to be locked in place. The material forming the applicator stick is thus spread over the surface of the piece in a layer of pasty consistency which, when solidified, traps the metal carbide particles.

This second method, in addition to having the same disadvantages which characterize the bonded carbide deposits obtained by the first method, requires additional skill on the part of the welder to insure complete transformation of the metal oxide to the metal carbide and requires even longer times to satisfactorily surface a given area. This process is only operable on surfaces that are at least nearly horizontal.

A third method of cementing hard metal carbides to surfaces is one in which a mixture of carbon and the metal oxide is merely sprinkled on the surface of the piece. The mixture is heated while simultaneously melting a superficial layer of the surface of the piece. Upon cooling those carbides that have been transformed from oxide are held in the resolidified surface of the piece.

This third method is even less attractive than the first two described methods because the quality of the deposit is dependent upon the skill of the welder to form the carbide particles and then superficially bury them in a melted surface film of metal and there is very little control possible.

In spite of the disadvantages stated above bonded carbide deposits have substantial utility, especially in highly abrasive applications where temperature, corrosive environment and impact are not factors.

Many successful alloy steel hard-facing weld deposits have been developed for applications involving heavy impact, severe corrosive media, elevated temperatures, or applications where large areas are to be hard-faced. The high degree of abrasion resistance conferred by grains of preformed hard metal carbides is absent but lack of such carbides must be countenanced in order to secure increase in impact strength, corrosion resistance, high temperature strength, oxidation resistance and speed and ease of deposition. These properties are obtained by careful selection of alloying elements in the electrode. As a group the alloy hard facing electrodes are successful and widely used.

Arc welding electrodes are typically coated wires or filled tubes. It was recognized long ago that these forms are substantially equivalent, the objective being to present to the weld locus the proper amounts of weld metal, deoxidation elements such as aluminum, fluxes, when employed, and gas from some source for environmental control in case such control is employed.

It is common, as well known to those skilled in the art, to incorporate titanium dioxide and/or metallic titanium in welding electrodes. Titanium dioxide has been used as a slag-forming ingredient and as an aid in the control of metal transfer. Metallic titanium, which is recognized as having a high affinity for oxygen and nitrogen, has been used as a deoxidizer. The amount of titanium added for deoxidation purposes is small and is determined by empirical methods as the amounts of oxygen and nitrogen present are not precisely determinable. To insure complete deoxidation, a slight excess of titanium may sometimes be used. This may result in a residual concentration of titanium in the weld metal of up to 0.5–0.6% Ti and, if the alloy happens to be high enough in carbon content, may cause the formation of some titanium carbide. The amount of such carbide when formed is very small and does not significantly affect the properties of the deposit.

I provide a method by which hard facing weld deposits can be fortified with wear resisting crystals of titanium carbide grown in situ in the crystallizing weld metal. By this method substantially all the advantages of the supporting hard facing deposit, such as impact strength, corrosion resistance, elevated temperature strength, oxidation resistance and ease and speed of deposition, are retained while the wear resisting qualities of titanium carbide are added to deliver extra service life.

I provide a method of forming a wear-resistant weld deposit comprising forming in an arc welding reaction zone a carbon-containing ferrous weld metal pool, introducing into the reaction zone at least one of the materials of the group consisting of titanium, titanium alloy and oxide of titanium, alone or combined with another oxide, and thereby forming titanium carbide particles by crystallization in situ in the solidifying weld metal which forms the matrix and maintaining in the reaction zone an amount of carbon at least equal to the total of (1) the amount of carbon required to form the titanium carbide particles plus (2) the amount of carbon required to satisfy the carbon demands of the matrix plus (3) the amount of carbon required to reduce titanium oxide and other metal oxides reducible by carbon if present plus (4) the amount of carbon required to combine with oxygen derived from the reaction zone atmosphere. The component which comprises at least one of the materials of the group consisting of titanium, titanium alloy and oxide of titanium, alone or combined with another oxide, contains titanium in an amount between about .8% and about 16% by weight of the weld deposit. Because the recovery efficiency factor for titanium is about 75% the electrode contains titanium in an amount between about 1% and about 22% of the electrode metal weight. In terms of the weld deposit the total amount of carbon is preferably equal to between about 1% and 9%. Because carbon may be required in the electrode for reduction purposes as well as for deposit formation and because of the efficiency factor of about 85–90% the total amount of carbon is preferably equal to between about 1.1% and about 17% by weight of electrode metal. I also preferably maintain in the reaction zone at least one of the following listed metals in the stated percentage range.

Metal: Percentage by weight of weld deposit
Nickel _____ Trace to 22% maximum.
Manganese _____ .3% minimum to 18% maximum.
Chromium _____ Trace to 35% maximum.
Molybdenum ___ Trace to 8% maximum.
Tungsten _____ Trace to 4% maximum.
Vanadium _____ Trace to 2% maximum.

I also provide a carbon-containing ferrous metal electrode for forming a wear-resistant weld deposit, the electrode containing as a component at least one of the materials of the group consisting of titanium, titanium alloy and oxide of titanium, alone or combined with another oxide, such component containing titanium in an amount between about 1% and about 22% by weight of the electrode metal, and carbon to form titanium carbide particles by crystallization in situ from the weld metal produced by the electrode, the carbon being present in an amount at least equal to the total of (1) the amount of carbon required to form the titanium carbide particles plus (2) the amount of carbon required to satisfy the carbon demands of the matrix plus (3) the amount of carbon required to reduce titanium oxide and other metal oxides reducible by carbon if present plus (4) the amount of carbon required to combine with oxygen derived from the reaction zone atmosphere. As indicated above, such total amount of carbon is preferably equal to between about 1.1% and about 17% by weight of the electrode metal. The electrode preferably also contains at least one of the metals above listed in the stated percentage range.

By incorporating in an electrode an appropriate source of titanium plus a requisite quantity of carbon, to be discussed later, it has been found that carbon and unexpectedly large quantities of titanium can be dissolved in the electrode metal and transferred across the welding arc and that significant quantities of titanium carbide particles can be crystallized in situ from the melt.

It has been found that the source of titanium can be either metallic in character or, advantageously from a cost standpoint, titanium oxide, alone or associated with other metal oxides, accompanied by free carbon to accomplish its reduction.

By careful control of the carbon addition to an electrode, titanium, in either the metallic or oxide form, can be readily converted to titanium carbide with no special technique or control required of the welder. Further, the deposition rates and electrode behavior are similar to those of conventional hard-facing electrodes.

The wear resistance of any given alloy improves as the quantity of titanium carbide increases. This has been demonstrated by a wear testing apparatus using standard abrasive paper. The increase in wear resistance is small for concentrations of carbide less than about 1%. This lower limit of 1% is the effective threshold value at which significant increases in wear resistance begin. Above 1% of titanium carbide the improvement is marked and the ability of the welding operation to produce titanium carbide in the deposit sets a maximum practical limit of about 20% titanium carbide. The lower and upper limits of titanium carbide, namely 1% and 20%, contain stoichiometrically .8% and 16% titanium respectively which are the limits of titanium previously specified. The maximum value, coincidentally, falls in the lower range where the deposit begins to assume the mechanical properties of the carbide rather than of the matrix and to lose some of its metallic characteristics such as ductility.

For the purpose of calculating the amount of titanium to be added as electrode metal it has been found in the practice of the invention that the recovery of titanium as titanium carbide in the weld deposit is of the order of three-fourths of the titanium added as electrode metal.

The following table shows examples of the wear characteristics of several analyses with and without the presence of titanium carbide formed in situ from carbon and ferro-titanium and/or titanium dioxide. The tests were performed under standardized conditions. The weight loss is a measure of wear resistance; the less the weight loss the better the wear resistance.

TABLE I

| Example | Nominal Composition | Percent Titanium Added As Electrode Metal | Average Weight Loss (mg.) |
|---|---|---|---|
| 1A | 6% Cr, 4% Mo, 3.5% C | None | 209.4 |
| 1B | 6% Cr, 4% Mo, 3.5% C | 1.1 | 123.0 |
| 1C | 6% Cr, 4% Mo, 3.5% C | 3.5 | 93.7 |
| 1D | 6% Cr, 4% Mo, 3.5% C | 5.2 | 32.3 |
| 2A | 30% Cr, 3.5% Mo, 3.0% C | None | 247.5 |
| 2B | 30% Cr, 3.5% Mo, 3.0% C | 5.2 | 159.5 |
| 3A | 13% Cr, 1.5% Mo, 3.0% C | None | 219.2 |
| 3B | 13% Cr, 0.5% Mo, 3.0% C | 3.7 | 140.2 |
| 4A | 18% Cr, 8 Ni, .60% C | None | 311.5 |
| 4B | 18% Cr, 8 Ni, .50% C | 1.0 | 219.0 |

Computations of carbon required in the welding electrode system must account for carbon used for these objectives:
(1) Forming titanium carbide,
(2) Supplying carbon for the matrix,
(3) Reducing titanium oxide and other metal oxides reducible by carbon (if present),
(4) Sacrificial protection against the atmosphere (if oxidizing).

Carbon used in excess of the amount required to fulfill these objectives, whether introduced deliberately or otherwise, is essentially wasted and is not considered in the calculation of required carbon.

The very common and useful "coated electrode" can be employed in the practice of the present invention. In this case small oxidation losses due to air are expected and provided for.

Certain welding systems, such as those employing gas shielded electrodes, reduce oxidation reactions to a very low level by flooding the arc area with non-oxidizing gas, and my invention may be so employed. In such case, since oxidation losses are low, most of the carbon usually employed to react with the oxidizing atmosphere becomes excess and may be omitted if desired. In other gas shielded welding systems in which the flooding gas is oxidizing, such as $CO_2$, oxidation losses approximate those of air.

Based upon deposit metal weight the minimum amount of carbon required in the electrode to form 1% titanium carbide in a non-alloy steel matrix is computed as illustrated below, the source of titanium in this case being metallic titanium. Electrode metal is defined as the sum of the carbon and the metallic components either present in the electrode or recoverable from compounds present in it. For simplicity in calculations the electrode metal weight is taken as equal to the deposit metal weight. This calculation is based upon a non-alloy steel matrix with the minimum carbon content necessary for the formation of 1% titanium carbide. If higher carbon contents are required by the matrix, and some common highly alloyed hard facing matrices require a carbon content as high as 5%, then the minimum carbon necessary for the formation of 1% titanium carbide must be increased by the amount of carbon required by the matrix.

A. Carbon for formation of 1% TiC
   in deposit (item 1 above) _____ 0.2% of electrode metal wt.
B. Carbon requirement for non-alloy
   steel matrix (item 2 above) ____ 0.8% of electrode metal wt.
C. Total A plus B _____ 1.0% of electrode metal wt.
D. Carbon efficiency due to sacrificial
   protection by carbon is typically
   90% in low carbon ranges (item
   4 above). Therefore, *minimum*
   total carbon is 1.00÷0.90 _____ 1.1% of electrode metal wt.

If titanium is introduced as titanium dioxide then additional free carbon must be added to react with the oxygen. In the case of 1% titanium carbide in the deposit 1.8% titanium dioxide is necessary in the electrode due to the recovery efficiency of titanium, which as above indicated is of the order of three-fourths of the titanium introduced. This amount of titanium dioxide would stoichiometrically require an additional 0.3% carbon.

In similar fashion the upper limit of total carbon may be calculated. As a practical matter it is governed by the amount of titanium oxide that can be incorporated in an electrode and be transformed to titanium carbide in a weld deposit while still retaining the desirable welding characteristics required in a hard facing electrode.

This calculation for maximum carbon to form 20% titanium carbide particles in a non-alloy steel matrix is illustrated below. Just as in the previous calculation, if higher carbon contents are required by the matrix then the carbon necessary for the formation of 20% titanium carbide must be increased by the amount of carbon required by the matrix. The stoichiometric amount of titanium present in 20% titanium carbide is 16%. In order to make 16% titanium available to the deposit 21.3% titanium from all sources must be present in the electrode as the recovery efficiency of titanium is of the order of 75%. Therefore, 35.5% titanium dioxide is stoichiometrically required.

A. Carbon required for reduction
   of 35.5% $TiO_2$ in coating
   (item 3 above) _____ 5.3% of electrode metal weight.
B. Carbon for formation of 20%
   TiC in deposit (item 1 above) 4.0% of electrode metal weight.
C. Carbon requirement for non-alloy steel matrix (item 2
   above) disregarding presence
   of TiC _____ .8% of electrode metal weight.
D. Total A plus B plus C _____ 10.1% of electrode metal weight.
E. Carbon efficiency due to sacrificial protection by carbon is
   typically 85% in high carbon ranges (item 4 above).
   Therefore, *maximum* total carbon for a non-alloy steel
   background is 10.1÷.85 ___ 11.9% of electrode metal weight.

In the case of a high carbon alloy steel matrix which would itself require 5% carbon, the maximum total carbon required to produce a deposit containing 20% titanium carbide would be:

A. Carbon required for reduction
   of 35.5% $TiO_2$ in coating
   (item 3 above) _____ 5.3% of electrode metal weight.
B. Carbon for formation of 20%
   TiC in deposit (item 1
   above) _____ 4.0% of electrode metal weight.
C. Carbon requirement for high
   alloy steel matrix (item 2
   above) disregarding presence
   of TiC _____ 5.0% of electrode metal weight.
D. Total A plus B plus C _____ 14.3% of electrode metal weight.
E. Carbon efficiency due to sacrificial protection by carbon is
   typically 85% in high carbon ranges (item 4 above).
   Therefore, *maximum* total carbon for a high carbon
   alloy steel background is
   14.3÷.85 _____ 16.8% of electrode metal weight.

The matrix which holds the carbide particles may have any hard-facing microstructure, such, for example, as austenite, austenite plus carbide, martensite, martensite plus carbide, or ferrite plus any decomposition product formed during the cooling of ferrous alloys such as pearlite or bainite.

The control of the behavior of the deposit matrix may be achieved by the usual practices of alloying with such elements as nickel, manganese, chromium, molybdenum, tungsten and vanadium. In this manner a matrix material to support the titanium carbide can be chosen from serviceable compositions to operate satisfactorily in any environment. Chromium in an alloy in an amount up to 35% is sufficient to develop corrosion and oxidation resistance as well as to increase hardenability and wear resistance. Molybdenum in an amount up to 8% confers high temperature strength and increases the hardenability of the alloy. Nickel is used in an amount up to 22%; in the lower concentrations it serves to increase the hardenability of the alloy while in the higher concentrations it imparts toughness and stabilizes the austenitic phase. Manganese in an amount between 0.3% and 18% is normally used with nickel, chromium and molybdenum to produce toughness and, in the higher concentrations, to produce austenitic structures which develop hardness under impact and good wear resistance while retaining toughness. Tungsten over 4% and vanadium over 2% when present along with titanium carbide progressively alter the form and properties of the titanium carbide; under the limits stated both enhance hardenability while tungsten increases hot hardness and vanadium helps control grain size.

The production of titanium carbide is technically possible in weld deposits containing the above stated elements at percentages higher than those given. However, the contribution to hard facing qualities which these elements can confer are well developed within the limits stated and the use of higher concentrations would normally be construed as wasteful. The essential mechanism is operable in the presence of other elements such as boron, columbium, copper and cobalt which are frequently present in hard facing matrices.

Certain residual elements normal to ferrous hard-facing deposits may also be present. The range of silicon is commonly from 1% to 3% and in special cases may go higher. Small percentages of nitrogen are usually present in hard facing weld deposits and any titanium nitride formed would be associated with titanium carbide as these compounds form a complete series of solid solutions. Phosphorus and sulfur may be present in typically commercial amounts.

In summary, an improvement in wear resistance is effected by the controlled formation of titanium carbide in any ferrous hard facing composition.

Listed below are examples of three electrodes the wear resisting qualities of whose deposits were compared in Table I.

*Example I.—Deposit listed as Example 1D in Table I*

The electrode was fabricated from a low carbon steel core wire bearing a coating whose composition is listed below. The coating was 32.8% of the total electrode weight.

| | Parts by weight |
|---|---|
| Titanium dioxide | 70 |
| Ferrotitanium (42% titanium) | 140 |
| Ferromanganese | 17 |
| Carbon | 80 |
| Ferrochromium (8% carbon) | 146 |
| Ferromolybdenum | 126 |
| Magnesium carbonate | 5 |
| Calcium carbonate | 5 |
| Silicate binder | 51 |

The deposit resulting had an increase in wear resistance from 209.4 mg. weight loss to 32.3 mg. weight loss produced in the formation of about 5% titanium carbide in the deposit. In this electrode 4.7% of the electrode metal is present as carbon and 5.2% of the electrode metal is present as titanium.

*Example II.—Deposit listed as Example 2B in Table I*

The electrode was fabricated from a 12% Cr, 2% Mo, core wire bearing a coating whose composition is listed below. The coating was 31.4% of the total electrode weight.

| | Parts by weight |
|---|---|
| Titanium dioxide | 34 |
| Ferrotitanium (42% titanium) | 150 |
| Carbon | 35 |
| Ferrochromium (8% carbon) | 218 |
| Ferromanganese | 18 |
| Magnesium carbonate | 2 |
| Calcium carbonate | 2 |
| Silicate binder | 39 |

The deposit resulting had an increase in wear resistance from 247.5 mg. weight loss to 159.5 mg. weight loss produced by the formation of about 5% titanium carbide in the deposit. In this electrode 3.3% of the electrode metal is present as carbon and 5.2% of the electrode metal is present as titanium.

*Example III.—Deposit listed as Example 3B in Table I*

The electrode was fabricated from a low carbon steel core wire bearing a coating whose composition is listed below. The coating was 39% of the total electrode weight.

| | Parts by weight |
|---|---|
| Titanium dioxide | 34 |
| Ferrotitanium (42% titanium) | 80 |
| Carbon | 48 |
| Ferrochromium (8% carbon) | 274 |
| Manganese | 45 |
| Ferromolybdenum | 38 |
| Magnesium carbonate | 5 |
| Calcium carbonate | 5 |
| Silicate binder | 40 |

The deposit resulting had an increase in wear resistance from 219.2 mg. weight loss to 140.2 mg. weight loss produced by the formation of about 3.5% titanium carbide in the deposit. In this electrode 5.0% of the electrode metal is present as carbon and 3.7% of the electrode metal is present as titanium.

While I have described certain present preferred embodiments of my invention and certain present preferred methods of practicing the same it is to be distinctly understood that the invention is not limited thereto but may be otherwise variously embodied and practiced within the scope of the following claims.

I claim:

1. A method of forming a wear-resistant weld deposit comprising forming in an arc welding reaction zone a carbon-containing ferrous weld metal pool, introducing into the reaction zone a component comprising at least one of the materials of the group consisting of titanium, titanium alloy and oxide of titanium, alone or combined with another oxide, such component containing titanium in an amount between about .8% and about 16% by weight of the weld deposit, and thereby forming titanium carbide particles by crystallization in situ in the solidifying weld metal which forms the matrix and maintaining in the reaction zone an amount of carbon at least equal to the total of (1) the amount of carbon required to form the titanium carbide particles plus (2) the amount of carbon required to satisfy the carbon demands of the matrix plus (3) the amount of carbon required to reduce titanium oxide and other metal oxides reducible by carbon if present plus (4) the amount of carbon required to combine with oxygen derived from the reaction zone atmosphere.

2. A method of forming a wear-resistant weld deposit comprising forming in an arc welding reaction zone a carbon-containing ferrous weld metal pool, introducing into the reaction zone a component comprising at least one of the materials of the group consisting of titanium, titanium alloy and oxide of titanium, alone or combined with another oxide, such component containing titanium in an amount between about 1% and about 22% by weight of the electrode metal, and thereby forming titanium carbide particles by crystallization in situ in the solidifying weld metal which forms the matrix and maintaining in the reaction zone an amount of carbon at least equal to the total of (1) the amount of carbon required to form the titanium carbide particles plus (2) the amount of carbon required to satisfy the carbon demands of the matrix plus (3) the amount of carbon required to reduce titanium oxide and other metal oxides reducible by carbon if present plus (4) the amount of carbon required to combine with oxygen derived from the reaction zone atmosphere.

3. A method of forming a wear-resistant weld deposit comprising forming in an arc welding reaction zone a carbon-containing ferrous weld metal pool, introducing into the reaction zone a component comprising at least one of the materials of the group consisting of titanium, titanium alloy and oxide of titanium, alone or combined with another oxide, such component containing titanium in an amount between about 1% and about 22% by weight of the electrode metal, and thereby forming titanium carbide particles by crystallization in situ in the solidifying weld metal which forms the matrix and maintaining in the reaction zone an amount of carbon at least equal to the total of (1) the amount of carbon required to form the titanium carbide particles plus (2) the amount of carbon required to satisfy the carbon demands of the matrix plus (3) the amount of carbon required to reduce titanium oxide and other metal oxides reducible by carbon if present plus (4) the amount of carbon required to combine with oxygen derived from the reaction zone atmosphere, such total amount of carbon being equal to between about 1.1% and about 17% by weight of the electrode metal.

4. A method of forming a wear-resistant weld deposit comprising forming in an arc welding reaction zone a carbon-containing ferrous weld metal pool, introducing into the reaction zone a component comprising at least one of the materials of the group consisting of titanium, titanium alloy and oxide of titanium, alone or combined with another oxide, such component containing titanium in an amount between about .8% and about 16% by weight of the weld deposit, and thereby forming titanium carbide particles by crystallization in situ in the solidifying weld metal which forms the matrix, maintaining in the reaction zone an amount of carbon at least equal to the total of (1) the amount of carbon required to form the titanium carbide particles plus (2) the amount of carbon required to satisfy the carbon demands of the matrix plus (3) the amount of carbon required to reduce titanium oxide and other metal oxides reducible by carbon if present plus (4) the amount of carbon required to combine with oxygen derived from the reaction zone atmosphere, such total amount of carbon being equal to between about 1% and about 9% by weight of the weld deposit, and also maintaining in the reaction zone at least one of the following listed metals in the stated percentage range:

| Metal: | Percentage by weight of weld deposit |
|---|---|
| Nickel | Trace to 22% maximum. |
| Manganese | .3% minimum to 18% maximum. |
| Chromium | Trace to 35% maximum. |
| Molybdenum | Trace to 8% maximum. |
| Tungsten | Trace to 4% maximum. |
| Vanadium | Trace to 2% maximum. |

5. A carbon-containing ferrous metal electrode for forming a wear-resistant weld deposit, the electrode containing as a component at least one of the materials of the group consisting of titanium, titanium alloy and oxide of titanium, alone or combined with another oxide, such component containing titanium in an amount between about 1% and about 22% by weight of the electrode metal, and carbon to form titanium carbide particles by crystallization in situ from the weld metal produced by the electrode, the carbon being present in an amount at least equal to the total of (1) the amount of carbon required to form the titanium carbide particles plus (2) the amount of carbon required to satisfy the carbon demands of the matrix plus (3) the amount of carbon required to reduce titanium oxide and other metal oxides reducible by carbon if present plus (4) the amount of carbon required to combine with oxygen derived from the reaction zone atmosphere.

6. A carbon-containing ferrous metal electrode for forming a wear-resistant weld deposit, the electrode containing as a component at least one of the materials of the group consisting of titanium, titanium alloy and oxide of titanium, alone or combined with another oxide, such component containing titanium in an amount between about 1% and about 22% by weight of the electrode metal, and carbon to form titanium carbide particles by crystallization in situ from the weld metal produced by the electrode, the carbon being present in an amount at least equal to the total of (1) the amount of carbon required to form the titanium carbide particles plus (2) the amount of carbon required to satisfy the carbon demands of the matrix plus (3) the amount of carbon required to reduce titanium oxide and other metal oxides reducible by carbon if present plus (4) the amount of carbon required to combine with oxygen derived from the reaction zone atmosphere, such total amount of carbon being equal to between about 1.1% and about 17% by weight of the electrode metal.

References Cited by the Examiner

UNITED STATES PATENTS 2,927,990   3/1960   Johnson _____ 219—75

RICHARD M. WOOD, *Primary Examiner.*